Oct. 17, 1961 C. C. CUTLER 3,005,126

TRAVELING-WAVE TUBES

Filed June 15, 1950

5 Sheets-Sheet 1

INVENTOR
C. C. CUTLER
BY N. D. Ewing
ATTORNEY

INVENTOR
C. C. CUTLER
BY
N. D. Ewing
ATTORNEY

Oct. 17, 1961 C. C. CUTLER 3,005,126

TRAVELING-WAVE TUBES

Filed June 15, 1950 5 Sheets-Sheet 3

INVENTOR
C. C. CUTLER
BY N. S. Ewing
ATTORNEY

TRAVELING-WAVE TUBES

Filed June 15, 1950 5 Sheets-Sheet 4

INVENTOR
C. C. CUTLER
BY N. A. Ewing
ATTORNEY

INVENTOR
C. C. CUTLER
BY N. D. Ewing
ATTORNEY

United States Patent Office 3,005,126
Patented Oct. 17, 1961

3,005,126

TRAVELING-WAVE TUBES

Cassius C. Cutler, Gillette, N.J., assignor to Bell Telephone Laboratories, Incorporated, New York, N.Y., a corporation of New York Filed June 15, 1950, Ser. No. 168,202
20 Claims. (Cl. 315—3.5)

This invention relates generally to wide band microwave amplifiers and more particularly to traveling-wave tubes, in which the interaction between a stream of electrons and a traveling electromagnetic wave is utilized to secure gain.

One object of the invention is to enable maximum power output and efficiency to be obtained from a traveling-wave tube.

Another object is to maintain stability and avoid undesirable impedance effects in all portions of a traveling-wave tube.

A further object of the invention is to reduce the size and power requirements of the electron beam focusing means of the tube.

Still another object is to eliminate possible irregularities in the magnetic field produced by the electron beam focusing means.

A still further object is to avoid loss of gain caused by wide differences of electron velocity within the electron stream.

In the past, it has generally been necessary to provide traveling-wave tube circuits with high frequency attenuation or loss in order to maintain stability and avoid bad long-line impedance effects. It is extremely difficult to secure accurate impedance matches between the traveling-wave circuit and the signal input and output circuits over the broad frequency range in which a traveling-wave tube operates. Components of the radio frequency signal wave tend, therefore, to be reflected back and forth along the traveling-wave circuit. Such components traveling in the direction of electron flow are amplified and may produce oscillations, resulting in tube instability. When such components are reflected back to the input end of the traveling-wave circuit out of phase with the incoming signal wave, the signal wave is degraded, resulting in what may be termed long-line impedance effects.

Reflected components of the radio frequency signal wave tend to be absorbed by attenuation, which, as disclosed in application Serial No. 640,597, filed January 11, 1946, by J. R. Pierce, now United States Patent 2,636,948, issued April 28, 1953, may be introduced into the traveling-wave circuit. If the total circuit attenuation is comparable in magnitude to the over-all gain of the tube, instability and long-line impedance effects may be effectively reduced. In the past, circuit attenuation or loss has been either lumped at some point along the traveling-wave circuit or distributed uniformly over most of the length of the circuit. However, under certain conditions, both methods present difficulties which it is desirable to overcome. Much better results may be obtained by following the procedures which are to be described.

In accordance with one feature of the present invention, the high frequency attenuation or loss distribution in a traveling-wave tube is such that the tube may be operated at maximum power and efficiency while avoiding instability and undesirable impedance effects. The power referred to is the signal output power, while the efficiency referred to is the ratio of the signal output power to the direct-current input power. Short sections of substantially lossless circuit are left at both ends of the tube and the attenuation is distributed along a center section intermediate the end sections so that the attenuation per unit length is greater near the input end than it is near the output end. To make up the center section of distributed loss, a relatively short section of very high attenuation per unit length may be followed by a relatively long section of only moderate attenuation per unit length or the attenuation per unit length may be at a maximum near the input end of the section and decrease gradually to substantially zero at the output end. In both examples, the total attenuation over the length of the traveling-wave circuit is comparable in magnitude to or greater than the net gain of the tube. The first-mentioned embodiment, in which a relatively short section of high attenuation per unit length is followed by a relatively long section of only moderate attenuation per unit length, represents the distribution affording maximum gain for a given length consistent with maximum power and efficiency. The second, in which the attenuation per unit length is at a maximum near the input end of the section and decreases gradually to substantially zero at the output end, represents the distribution affording maximum stability and freedom from longline impedance effects consistent with maximum power and efficiency. By way of example, the present feature of the invention is found to make possible efficiencies of the order of ten per cent, as compared with the one-half of one per cent to five per cent, varying from tube to tube, which were previously available.

In the operation of traveling-wave tubes, it has generally been found necessary to supply some kind of a magnetic focusing field to maintain the desired electron beam dimensions over relatively long distances. Often this is accomplished by placing the whole beam and associated structure in the strong uniform magnetic field produced by a solenoid. The usual result is a fairly bulky structure requiring considerable focusing power and thus impairing the total power efficiency of the tube.

In accordance with another feature of the present invention, permanent magnets are employed as auxiliaries to a solenoid in a composite system and the bulk and power requirements of the focusing system are thereby considerably reduced. The traveling-wave circuit is within the field of the solenoid in its portion lying between the signal input and output circuits, and the uniform field is extended past the input and output circuits by means of the permanent magnets. Soft steel transverse plates may be employed to straighten out any irregularities which appear in the focusing field.

In the past, it has also been found that the gain theoretically available from a traveling-wave tube is reduced due to a velocity spread within the electron stream. Electrons which are out of synchronism with the traveling wave do not contribute their full share to the gain of the tube and the over-all gain is thereby reduced.

In accordance with still another feature of the invention, the electron gun is shielded from the magnetic focusing field and the electron stream is subjected to the field abruptly at the point of minimum beam diameter. The electrons are thereby made to flow in parallel helical paths and the direct-current beam velocity is constant across the beam.

In addition, beam focusing problems are minimized and much better electron transmission than would otherwise be possible is secured. Transmission approaches one hundred percent for very dense beams and very few electrons are lost to the wave transmission circuit in transit.

Additional objects and features of the present invention will appear from a study of the following detailed exposition. In the drawings, which are substantially to scale:

Figure 1:
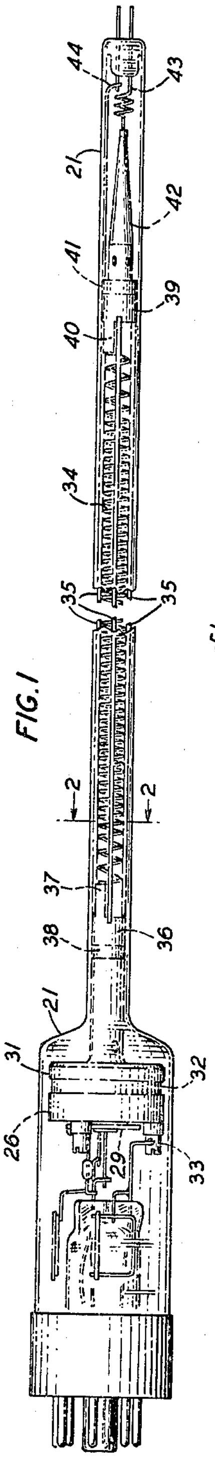
FIG. 1 illustrates a traveling-wave tube as it appears without signal input and output circuits, focusing means, and miscellaneous attachments.

Referring particularly to FIG. 1, the traveling-wave tube shown is enclosed in an elongated glass envelope 21. Envelope 21 includes an enlarged portion at its left end to house the electron gun assembly, but is of uniform diameter over most of the rest of its length, where it houses the signal wave transmission circuit. Envelope 21 is closed at both ends, thus enabling the tube to be evacuated.

Figures 2, 3:
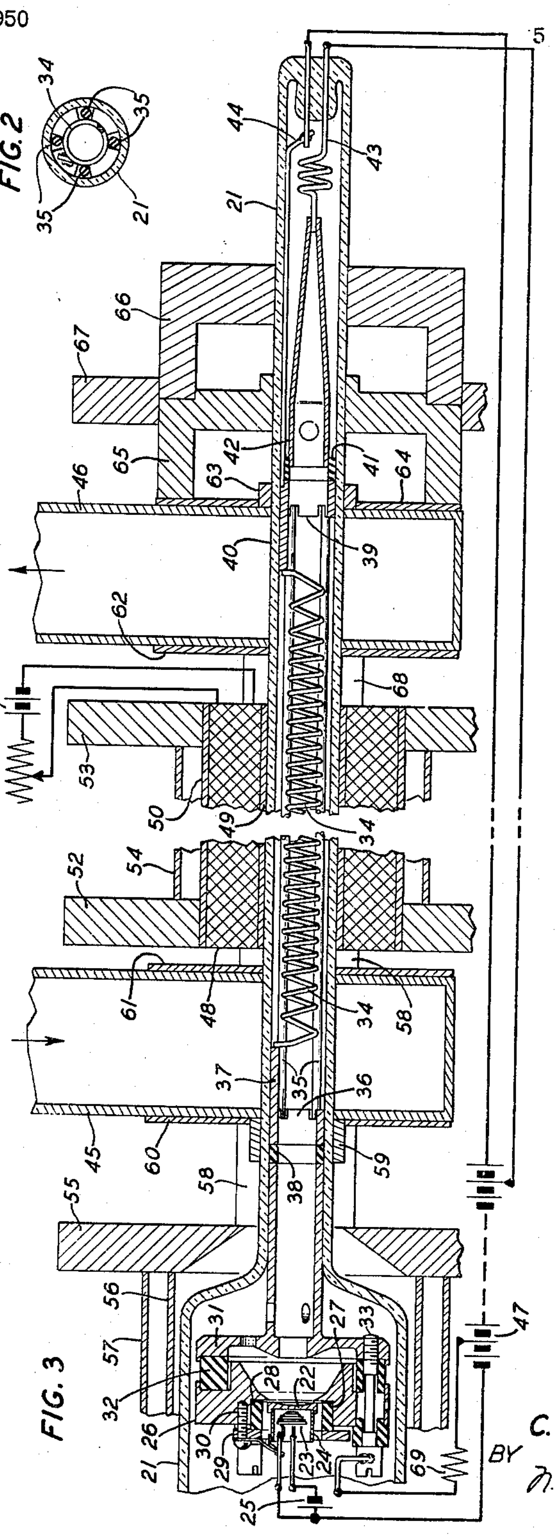
FIG. 2 is a transverse cross section of the tube of FIG. 1 showing the relationship of the wave transmission helix, the helix-support rods, and the glass envelope of the tube.
FIG. 3 is a longitudinal cross section of the tube of FIG. 1, complete with input and output circuits, focusing means, and miscellaneous attachments.

FIGS. 2 and 3 show the structural details of the tube. The electron gun supporting assembly is of a type well known in the vacuum tube art and is therefore not shown. While schematic connections are shown to several of the gun elements, it is to be understood that they are actually to the tube base. FIG. 1 shows the general outline of the gun supporting assembly and the tube base to which actual connections are made.

Referring to FIG. 3, an electron-emissive cathode 22 is located within the enlarged left end of envelope 21. Cathode 22 may be in the form of a conducting plate with the axis of envelope 21 normal to its broad surfaces. Cathode 22 is aligned with the hollow interior of the small-diameter portion of envelope 21. The right-hand face of cathode 22 may be concave.

A heating coil 23 is located just to the left of cathode 22 and is shielded by a short tubular conducting member 24. Member 24 is attached to the left-hand face of cathode 22 and is of substantially the same diameter as cathode 22. One side of heater 23 is conductively connected to member 24 and to one side of a heater supply battery 25. The other side of heating coil 23 is connected to the other side of battery 25.

An electron beam forming electrode 26 surrounds and is coaxial with cathode 22. Electrode 26 is a hollow member, the inner surface of which forms an extension of the concave face of cathode 22. The inner surface of electrode 26 is defined, in effect, by a pair of coaxial right circular truncated cones, the portion of the surface nearest cathode 22 being defined by a cone of smaller altitude than the cone defining the portion of the surface farther to the right.

Tubular member 24 is located largely within the left-hand portion of electrode 26 and is surrounded by a non-conducting ceramic cylinder 27. Cylinder 27 fits against the inside surface of the left-hand portion of electrode 26 and is spaced slightly apart from electrode 26 at its right end by an annular non-conducting spacer 28. An annular conducting plate 29 surrounds tubular member 24 and fits against the left-hand end of cylinder 27. Three screws 30 are equally spaced around the outside portion of plate 29 to hold it in place and extend into the left-hand face of electrode 26. The end of heating coil 23 that is connected to tubular member 24 is also connected to plate 29, thereby holding cathode 22 and beam forming electrode 26 at the same potential.

An anode electrode 31 is located to the right of beam forming electrode 26 and comprises a relatively flat circular flange-like portion and a tubular "nose" portion extending into the small-diameter portion of envelope 21. The flange-like portion of anode 31 is at the left and is aligned with electrode 26. A central aperture in anode 31 is aligned with the axis of envelope 21 to permit the passage of electrons. Around the aperture, the left-hand end of anode 31 extends to the left toward cathode 22, the extension being in the form of a section of a right circular truncated cone. Anode 31 is spaced from and electrically insulated from beam forming electrode 26 by a ceramic ring 32. Anode 31, ceramic ring 32, and beam forming electrode 26 are held together by three screws 33, which are spaced about the periphery of the respective elements. The screws 33 are insulated from electrode 26 but are joined directly to anode 31, thereby enabling the potential of anode 31 to be fixed by the application of a potential to one or more of the screws 33.

The structure which has been described forms an electron gun. The gun assembly is held in place within the enlarged left-hand end of envelope 21 by the elongated "nose" of anode 31 and by leads which are connected to one or more of the screws 33. The cathode heating element 23 is held in place by the leads connecting it to the tube base and cathode 22 and tubular member 24 are positioned by the lead connecting the latter element to one side of heating coil 23.

To the right of the "nose" portion of anode 31, an elongated wire helix 34 extends through most of the small-diameter portion of envelope 21. Helix 34 is of substantially uniform pitch throughout most of its length and may be wound so that the ratio of its length to the total length of wire forming it is about one to thirteen. At both ends, the pitch of helix 34 is gradually increased for impedance matching purposes. Helix 34 is positioned within and separated from envelope 21 by four ceramic supporting rods 35 which are spaced about its periphery. FIG. 2 shows the relative positions of helix 34, rods 35, and envelope 21.

The left-hand ends of the rods 35 are supported by a collar 36 which is in the form of a hollow conducting cylinder. Collar 36 contains slots spaced about its right-hand end to receive the left-hand ends of rods 35 and a conducting strip 37 extends to the right between two of the rods 35 at the top of the tube. The left-hand end of helix 34 is attached to the right-hand end of strip 37. A ceramic ring 38 separates the left-hand end of collar 36 from the right-hand end of the "nose" portion of anode 31.

The right-hand end of rods 35 are supported by a collar 39 which is the same as collar 36 at the other end of the tube. A conducting strip 40 is the same as strip 37 and extends from collar 39 to the right-hand end of helix 34. A ceramic ring 41 is located to the right of collar 39 and supports a collector electrode 42. The left-hand end of collector 42 is in the form of a short tubular conductor and the right-hand end is in the form of a hollow conducting cone. A lead 43 is attached to the right-hand end of collector 42, contains a short coiled section to serve as a high frequency choke, and extends through the right-hand end of envelope 21. A lead 44 is attached to collar 39, passes through ceramic ring 41, and also extends through the right-hand end of envelope 21.

The radio frequency signal wave which is to be amplified is applied to helix 34 through an input wave guide 45. Wave guide 45 is a standard hollow rectangular wave guide and is closed at one end. Envelope 21 extends through apertures in the walls of wave guide 45 with its axis normal to the broad surfaces of the guide. The right-hand end of collar 36 is flush with the inside surface of the left-hand wall of wave guide 45 and conducting strip 37 extends about half-way into the guide. Strip 37 is midway between the narrow side walls of the guide and is substantially one-fifth of a signal wavelength from the closed end.

The amplified signal is withdrawn from the other end of helix 34 through an output wave guide 46. Output guide 46 is substantially the same as input guide 45 and the inside surface of its right-hand wall is flush with the left-hand end of collar 39. Conducting strip 40 extends half-way into the guide and is located substantially one-fifth of a wavelength from its closed end.

Operating potentials are supplied from a heater battery 25, as previously discussed, and from a main direct-current source 47. The most negative point of source 47 is connected to the base prong which connects to cathode 22, while an intermediate positive point is connected to the base prong which connects to anode 31. The most positive point is connected to lead 44 to determine the potential of helix 34 and a slightly less positive point is coupled to lead 43 to determine the voltage of collector 42. The illustrated battery connections of anode 31, lead 43, and lead 44 are shown by way of example. Other relative potentials may be used.

When heater 23 is energized by battery 25, the electron gun projects a converging electron beam to the right through the central aperture of anode 31 and lengthwise through helix 34. At the right-hand end of the tube, the electrons are collected by collector electrode 42. In order to confine the moving electrons to the relatively narrow path provided for them, a strong longitudinal magnetic focusing field is provided. To this end, the portion of envelope 21 between wave guides 45 and 46 is surrounded by a solenoid 48. A non-magnetic tubular member 49 fits between the exterior of envelope 21 and the inside surface of solenoid 48, and a tubular magnetic shield 50 fits around the outside surface of solenoid 48. Solenoid 48 is supplied with direct current by a battery 51.

A pair of soft steel end plates 52 and 53 are located at respective ends of solenoid 48. End plates 52 and 53 have central apertures into which the respective ends of solenoid 48 and shield 50 are fitted. The axis of envelope 21 is normal to both end plates 52 and 53. The left-hand face of end plate 52 is substantially flush with the left-hand end of solenoid 48, while the right-hand face of end plate 53 is substantially flush with the right-hand end of solenoid 48. A second tubular magnetic shield 54 is concentric with and surrounds shield 50. Shields 50 and 54 are separated slightly from each other and shield 54 extends between the right and left-hand faces, respectively, of end plates 52 and 53.

A soft steel end plate 55 also fits around envelope 21 at its neck, that is, near the portion of the reduced diameter part of envelope 21 that is nearest the enlarged gun-containing part. A pair of concentric tubular magnetic shields 56 and 57 extend from the left-hand side of end plate 55 and enclose the portion of envelope 21 housing the electron gun structure.

A pair of permanent bar magnets 58 are bridged between end plates 52 and 55 on either side of input wave guide 45 to extend the magnetic focusing field set up by solenoid 48. Each magnet 58 is parallel with the axis of envelope 21. A short non-magnetic collar 59 fits closely around envelope 21 and extends to the left from the left wall of input wave guide 45. To straighten out possible defects in the magnetic field, a circular soft steel plate 60 is fitted against the outside of the left-hand wall of input wave guide 45. Plate 60 fits outside of collar 59 and extends perpendicularly to the magnetic field. Another soft steel plate 61 is fitted against the outside of the right-hand wall of input wave guide 45 and performs a similar function.

A circular soft steel plate 62, which is substantially identical to plates 60 and 61, fits against the outside of the left-hand wall of output wave guide 46. Plate 62 has a central aperture to accommodate envelope 21 and extends perpendicularly to the magnetic focusing field. A short non-magnetic collar 63 surrounds envelope 21 and extends to the right from the right-hand wall of output wave guide 46. A circular soft steel plate 64 fits against the outside of the right-hand wall of output guide 46 and extends perpendicularly to the magnetic field to straighten out possible irregularities. To the right of plate 64 are located a pair of resonators 65 and 66, which serve as radio frequency chokes to prevent the signal wave from being transmitted beyond them. Resonator 65 is between resonator 66 and plate 64. The resonant cavities within resonators 65 and 66 are of the annular re-entrant type, and collar 63 is part of the structure defining the cavity of resonator 65. A soft steel end plate 67, corresponding to end plates 52, 53, and 55, is fitted around the exterior of resonators 65 and 66 and extends perpendicularly to the axis of envelope 21. A pair of permanent bar magnets 68 are bridged between end plates 53 and 67 on either side of output wave guide 46 to extend the magnetic focusing field of the tube. Magnets 68 are parallel to the axis of envelope 21 and are outside the side walls of output wave guide 46.

In the operation of the described traveling-wave tube, an electron stream is projected, as previously discussed, from cathode 22 to collector 42. The stream is confined to its path by the strong longitudinal magnetic focusing field set up by solenoid 48 and permanent magnets 58 and 68. The incoming signal wave energizes coupling strip 37, which serves as an antenna, and is thereby transmitted to helix 34. The wave travels along helix 34 at a velocity approximating that of the electron stream and is caused to grow in amplitude by interaction between its electric field components and the electron stream. At the right-hand end of helix 34, the amplified wave energizes coupling strip 40, which in turn excites a wave of comparable amplitude in output wave guide 46. From there the amplified wave may be applied to a suitable load circuit.

By way of example, the following values are typical of a number of tubes of the type described:

| | |
|---|---|
| Beam potential ---------- volts | 1700 |
| Beam current ---------- milliamperes | 40 |
| Magnetic field ---------- gauss | 200 |
| Mean helix diameter ---------- inches | 0.194 |
| Effective beam diameter ---------- do | 0.110 |
| Ratio of actual to ideal helix impedance ---------- | 0.6 |
| Total circuit attenuation ---------- decibels | 45 |
| Length of helix wire ---------- wavelengths | 47 |
| Mean signal frequency ---------- megacycles | 4000 |
| Low level gain ---------- decibels | 36 |

In the past, helices of traveling-wave tubes have been provided with radio frequency attenuation or loss to enhance stability and to avoid undesirable impedance effects. Even with the impedance matching scheme shown in FIG. 3, where the end turns of helix 34 are increased in pitch as the tips of the coupling antennas 37 and 40 are approached, it is extremely difficult to secure exact impedance matches between helix 34 and input and output wave guides 45 and 46, over the entire frequency range in which the tube operates. Components of the radio frequency signal wave tend to be reflected back and forth along helix 34. Such components are amplified by interaction with the electron stream when they travel in the direction of electron flow and the tube tends to be unstable. When such components are reflected back to the input end of helix 34 out of phase with the incoming wave from input wave guide 45, the signal tends to be degraded and longline impedance effects result.

As has previously been indicated, reflected components of the radio frequency signal wave tend to be absorbed by attenuation or loss in the traveling-wave circuit when such attenuation is introduced along the wave path. Such attenuation or loss may be introduced, by way of example, by applying a thin coating of carbon or other conducting material on the helix supporting rods 35. In the past, such attenuation has been either lumped at an intermediate point along the length of the helix or distributed uniformly over most of its length. If the total loss introduced is comparable in magnitude to the net gain of the tube, instability and long-line impedance effects may be effectively reduced. However, as has also been mentioned previously, lumped and uniformly distributed attenuations present difficulties under certain conditions which it is desirable to overcome. If lumped attenuation is positioned along the helix to give maximum power capacity, the tube tends to oscillate and undesirable impedance effects tend to appear. If the attenuation is uniformly distributed, there is danger of instability if the attenuation per unit length is very great and is applied to allow maximum efficiency, and the tube tends to be inconveniently long if a small value of attenuation per unit length is used.

In accordance with a feature of the present invention, the attenuation is distributed along the traveling-wave circuit so that the tube may be operated at maximum power and efficiency. Instability and long-line impedance effects are largely avoided and the tube need not be inconveniently long. The attenuation or loss material may, by way of example, be deposited on the helix supporting rods 35 to introduce the proper loss into the traveling-wave circuit. Sprayed colloidal graphite and pyrolytically deposited carbon are two examples of such deposited loss material.

Figure 5A:
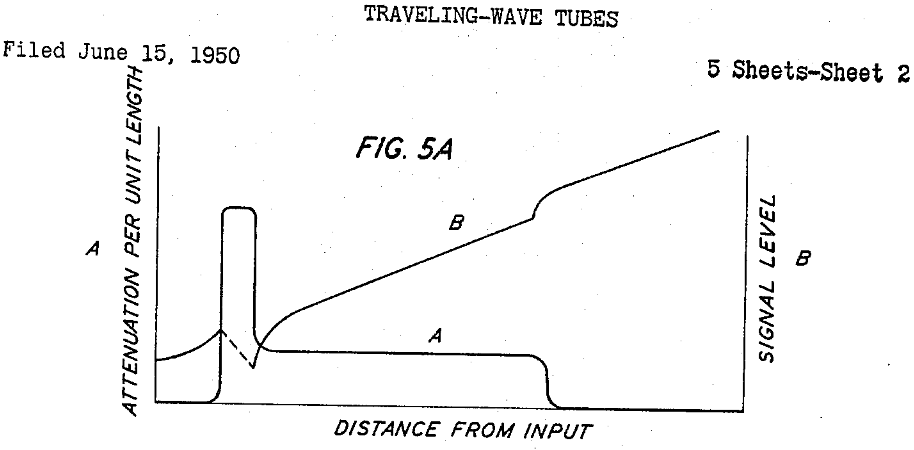
FIGS. 5 through 9 are graphs showing significant relationships involving attenuation distribution.
Figure 5B:
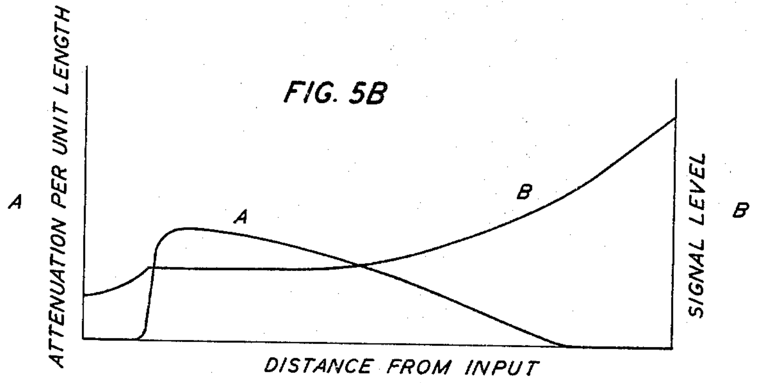

FIGS. 5A and 5B are curves showing preferred attenuation distributions in accordance with a feature of the present invention. In each figure, curve "A" represents decibels attenuation per unit length plotted against distance measured along the tube from the input circuit and curve "B" represents signal level in decibels plotted against the same quantity. The scales in each figure are linear and begin with zero. In general, in accordance with this feature of the invention, short sections of substantially lossless circuit are left at both ends of the tube and the attenuation is distributed along a center section intermediate the end sections so that the attenuation per unit length is at least several times greater near the input or upstream end of the center section than it is near the output or downstream end.

To make up the center section of distributed loss, in the embodiment of this feature of the invention diagramed in FIG. 5A a relatively short section of very high attenuation per unit length is followed by a relatively long section of only moderate attenuation per unit length. The high attenuation per unit length is at least several times the moderate attenuation per unit length and the distribution shown represents the design for maximum gain for a given length consistent with maximum power output and efficiency. By way of example the high attenuation per unit length may be thirty decibels per inch while the moderate attenuation per unit length may be three decibels per inch. In the embodiment diagramed in FIG. 5B, the attenuation per unit length is maximum near the input end of the lossy section and decreases gradually to substantially zero at the output end. This distribution represents the design for maximum stability and freedom from undesirable impedance effects, consistent with maximum power output and efficiency. The maximum attenuation per unit length may be of the order of ten decibels per inch. In both embodiments, the total attenuation over the length of the traveling-wave circuit is comparable in magnitude to or greater than the net gain of the tube.

Figure 4:
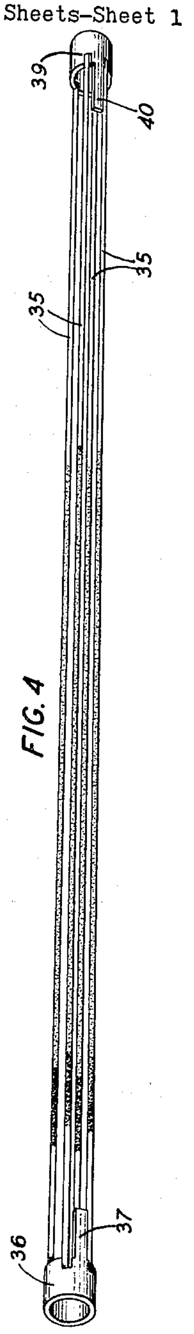
FIG. 4 shows the helix-support rods of the FIG. 1 tube with a schematic representation of one of the loss distributions within the scope of the present invention.

FIG. 4 illustartes the helix supporting rods 35 of the described tube with loss material deposited according to the distribution of FIG. 5A. As previously noted, colloidal graphite may be sprayed onto the rods 35 to give the desired distribution, or carbon may be deposited pyrolytically. Numerous other methods of depositing the loss may also be devised.

Figure 6:
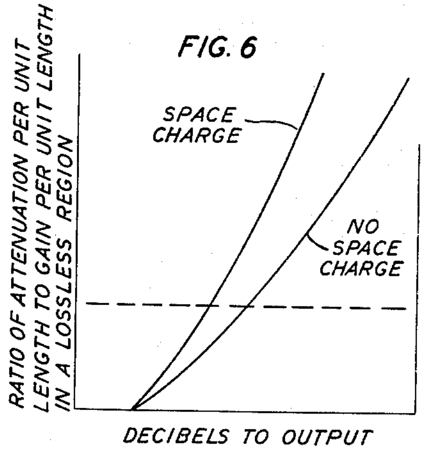

FIG. 6 shows several curves which may be used to determine the length of the substantially lossless output region of the FIG. 5A attenuation distribution. The scales are linear and begin with zero. The solid curves represent the ratio of attenuation per unit length to gain per unit length in a lossless region, plotted against gain to the output end of the circuit in decibels. The upper curve covers the case where the space charge of the electron stream is appreciable and the lower curve covers the case where it is neglected. Whichever condition may obtain, the solid curve represents the maximum permissible value of the ratio for particular distances upstream from the output circuit from the standpoint of power output. If the indicated value of the ratio is exceeded, power output tends to be reduced. The horizontal dashed line of FIG. 6 indicates a value of the ratio equal to unity. Where loss is applied uniformly the value of the ratio should be greater than unity for stability to be achieved.

With regard to their application to the distribution of FIG. 5A, the solid curves of FIG. 6 indicate how much attenuation may be applied at a given point without limiting the power output and efficiency. The farther back, that is, upstream, from the output the loss is applied, the greater is the loss that may be applied. The dashed line represents a limiting value below which the loss should not go when a uniform distribution is used, the uniform distribution being the section of moderate loss shown in FIG. 5A.

The curves of FIG. 6 may also be applied to the distribution of FIG. 5B, in which the maximum attenuation consistent with high power output is used, thereby holding long-line effects and instability problems to a minimum. As far back toward the input as the upstream end of the lossy section, curve "A" of FIG. 5B corresponds to the applicable solid curve of FIG. 6, the dashed curve being disregarded. The zero point of the solid curve indicates the downstream end of the lossy section and the value of the attenuation per unit length at all upstream points is determined by successive points on the curve.

FIGS. 5 and 6 are included in the description of the attenuation distribution feature of the present invention to show the distributions from one point of view. The following discussion includes the presentation of curves showing the distributions from another point of view.

In tube designs incorporating the present invention, it is desirable to have sufficient circuit attenuation to guarantee stability under practically any foreseeable input and output conditions and to have an additional attenuation margin in order to minimize long-line impedance effects. In order not to limit the power output unnecessarily, the output section of the traveling-wave circuit should be nearly lossless. Also, in order to start interaction at the input end of the tube satisfactorily, an input section of minimum loss is desirable. Therefore, in accordance with a feature of the present invention, the circuit comprises two lossless sections with a section of distributed loss between them in which the loss is distributed in a specified manner.

When a relatively long circuit section of substantially uniform loss is followed by a substantially lossless output section, in order to avoid overloading effects in the output section not only should overloading detectable in the intermediate lossy section be avoided, but the tube should be operated at a substantial margin below the level at which it appears. By test, it appears that if the signal level at the downstream end of the lossy region is more than six decibels below the overload level for that loss, the overload level being that level where output ceases to rise as the input level is increased, the output power will not be seriously limited.

At complete overload, the gain in the output section may be compressed by three decibels or more. Consequently, for the tube to be able to deliver the maximum power the minimum low level gain following a uniform distribution of loss should be these three decibels, plus six decibels for overload margin within the lossy region, plus the difference between the overload levels at the output end of the lossy region and the output end of the tube. It can thus be seen that there should be a rather large amount of gain following even a moderate amount of attenuation.

From the foregoing conclusions, an attenuation distribution design for maximum power may be obtained.

Following any section of uniform attenuating, there should be a minimum amount of low-level gain, that amount of gain depending upon the amount of attenuation preceding it. This limitation is illustrated by curve "A" in FIG. 7, where the maximum permissible attenuation per unit length at any point is plotted as a function of a parameter which normalizes distance measured back in the upstream direction from the output. Curve "A" corresponds to the solid curves of FIG. 6 and represents a maximum value beyond which the attenuation per unit length should not go. The curve, it will be noted, applies strictly only when the loss is uniform from the point in question back toward the input.

Figure 7:
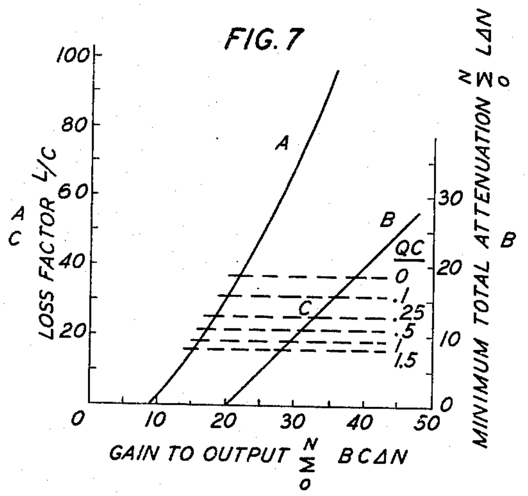

The ordinate of curve "A" of FIG. 7 is the loss factor L/C, where L is the attenuation in decibels per circuit wavelength and C is a parameter for gain per unit length which depends upon the circuit and electron beam impedances. C is given by the relation $$C^3=\frac{E^2}{\beta^2 P}\frac{I_0}{8V_0} \quad (1)$$

where E is the electric field acting on the beam at any point in the direction of wave propagation, $\beta$ is a phase constant, P is the transmitted power at any point along the circuit in watts, $I_0$ is the direct beam current in amperes, and $V_0$ is the direct beam voltage. $\beta$ is given by the relation $$\beta=\frac{\omega}{v}=\frac{2\pi}{\lambda g} \quad (2)$$

where $\omega$ is the signal frequency in radians per second, $v$ is the direct-current beam velocity in meters per second, and $\lambda g$ is the circuit wavelength in meters.

The abscissa of all the curves of FIG. 7, including curve "A," is $\Sigma BC\Delta N$, where B is a factor related to the increase per wavelength of the increasing wave of the tube and $\Delta N$ is an increment of the length of the circuit measured in wavelengths. The value of the abscissa $\Sigma BC\Delta N$ is not a simple function of length, since the value of B depends on attenuation, which in turn depends upon N, the length of the circuit in wavelengths measured from the tube output. Where the loss is uniform this is simply BCN and is proportional to length. Where it is non-uniform, the expression represents a step by step summation of incremental lengths.

The various symbols and quantities defined above and those which will be defined later are substantially the same as those defined in "Theory of the Beam-Type Traveling-Wave Tube," by J. R. Pierce, appearing in the Proceedings of the I.R.E., February 1947, volume 35, page 111, and in "Traveling-Wave Tubes," by J. R. Pierce, appearing in the Bell System Technical Journal, January 1950, volume 29, page 1.

In a practical design it is also desirable to avoid having too much gain in excess of attenuation in any section of the tube in order to maintain stability and avoid bad impedance effects. In the described tube for instance, it appears undesirable to allow net gain to exceed the passive loss by more than twenty decibels in any section of the tube. Otherwise, instability may occur. This limitation is shown by curve "B" of FIG. 7, which gives the minimum total attenuation allowable between any point and the output. Generally, the curve of attenuation per unit length should lie below curve "A" and the total attenuation should be above curve "B."

Curve "B" of FIG. 7 represents minimum total attenuation $\Sigma L\Delta N$ plotted against normalized gain to output $\Sigma BC\Delta N$. The various quantities are as previously described.

Dashed-line curves "C" of FIG. 7 are an approximation to the attenuation per unit length corresponding to curve "B" for different values of the tube parameter QC, where Q is a parameter related to the beam and circuit coupling and C is the parameter for gain per unit length previously defined. Curves "C" correspond to the dashed curve of FIG. 6, and indicate, for the designated value of QC, the minimum value of the loss factor L/C which is consistent with stability. In a practical tube, therefore, the attenuation per unit length should be such that the loss factor L/C lies below curve "A" and above the appropriate curve "C."

There are a number of ways in which the attenuation may be distributed consistently with the limitations which have been imposed. A few of these are illustrated in FIG. 8, along with several types of distribution which have been used in the past.

In the past, all of the attenuation has often been concentrated in a very short section. Such an arrangement is illustrated by the solid curve of FIG. 8A, which shows L/C, the normalized attenuation per circuit wavelength measured in decibels, plotted against CN, the normalized distance to the output circuit. The gain following the attenuation should be greater than thirty-three decibels in order to achieve maximum power capacity. If the attenuating section is not short, the gain following it should be forty decibels.

Figure 8A:
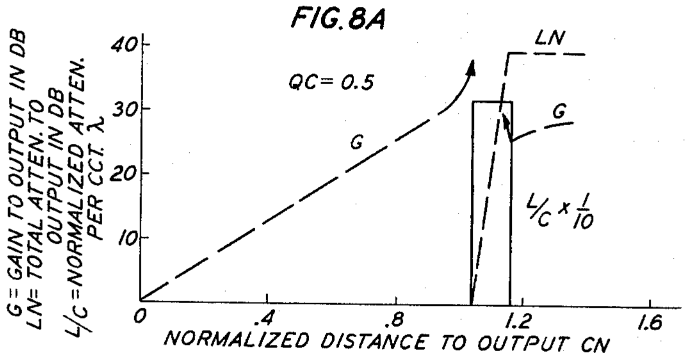

Also, shown in FIG. 8A are curves of G, the gain to the output circuit measured in decibels, and LN, the total attenuation to the output measured in decibels, plotted against CN. All values are for a value of QC equal to five-tenths.

It has been found that it is usually somewhat difficult to maintain stability and avoid long-line impedance effects in a tube using the attenuation distribution shown in FIG. 8A. Such a distribution is not, therefore, considered to be as advantageous for power tube design as those within the scope of the present invention.

In the past, the attenuation has also been uniformly distributed over the major part of the length of the tube, leaving short sections of essentially lossless circuit near the output and near the input. Such an arrangement is demonstrated by the solid curve of FIG. 8B, where L/C is plotted against CN. The attenuation should start at a distance from the input end of the circuit corresponding to CN equal to at least two-tenths, and should extend to the distance from the output given by curve "A" of CN are also given in FIG. 8B. QC is taken as equal to five-tenths.

Figure 8B:
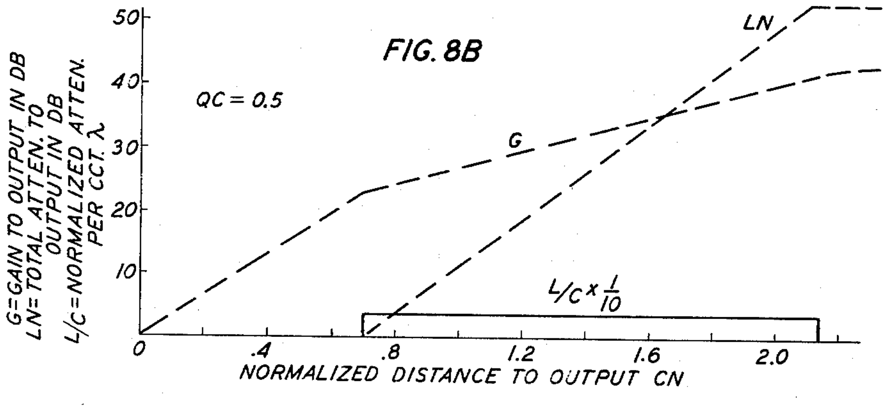

In the distribution of FIG. 8B, the attenuating section should be long enough to accumulate sufficient total attenuation for stability. With a large attenuation per unit length there would still be danger of instability because of the large gain in excess of attenuation in the output section. With losses small enough to avoid this difficulty, a very long lossy section, and therefore a long tube, would be required, as indicated in FIG. 8B. Except for very special applications where a very long circuit may be used, this arrangement would not be as desirable as attenuation distributions which are in accordance with the present invention.

Figures 8C, 8D:
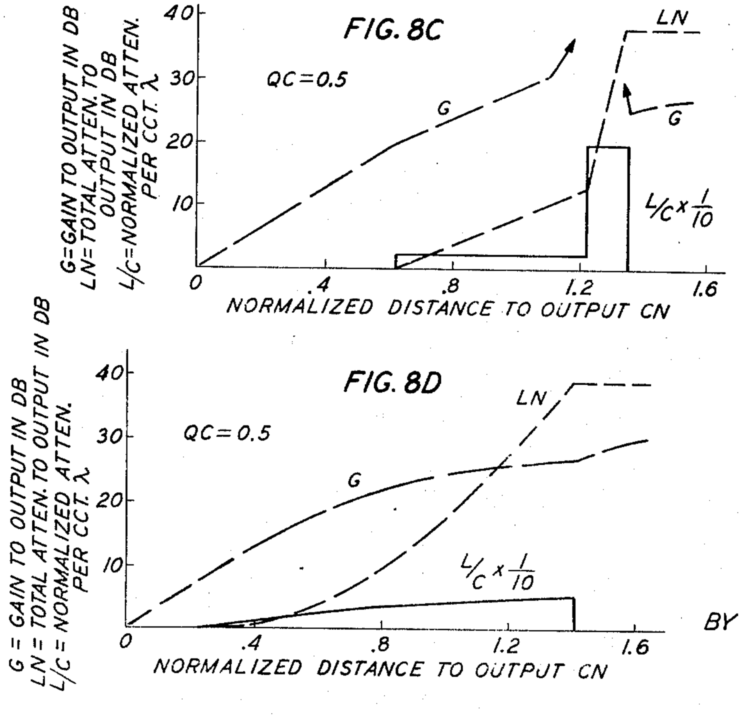
Figure 9A:
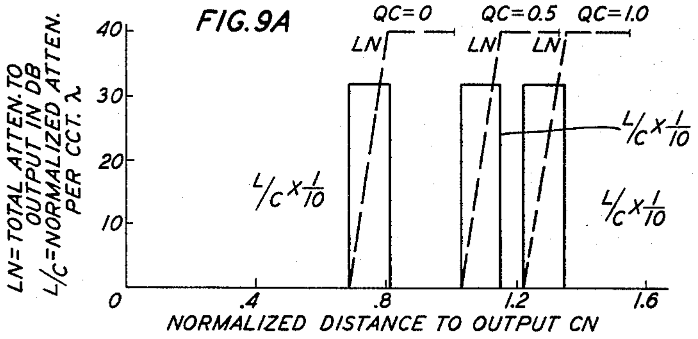
Figure 9B:
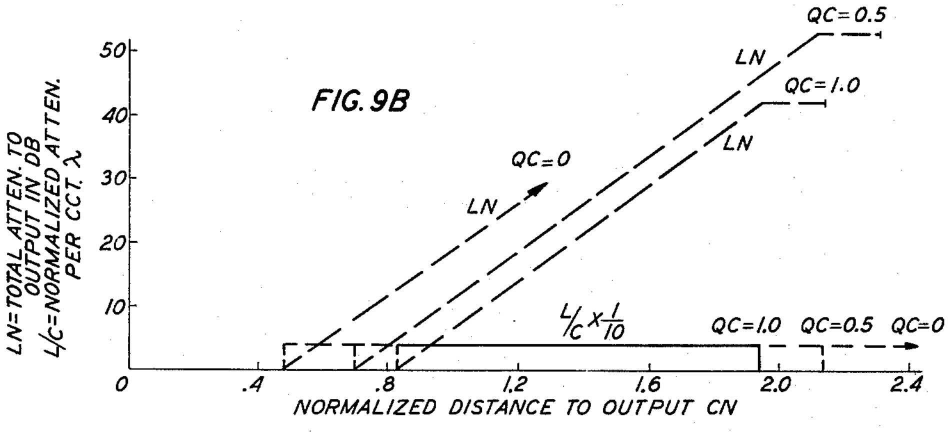
Figure 9C:
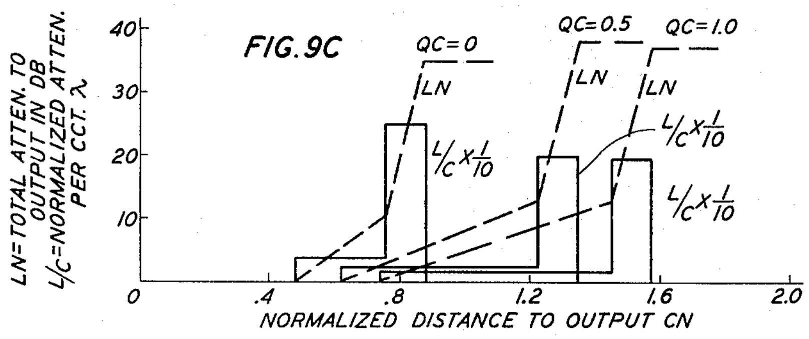
Figure 9D:
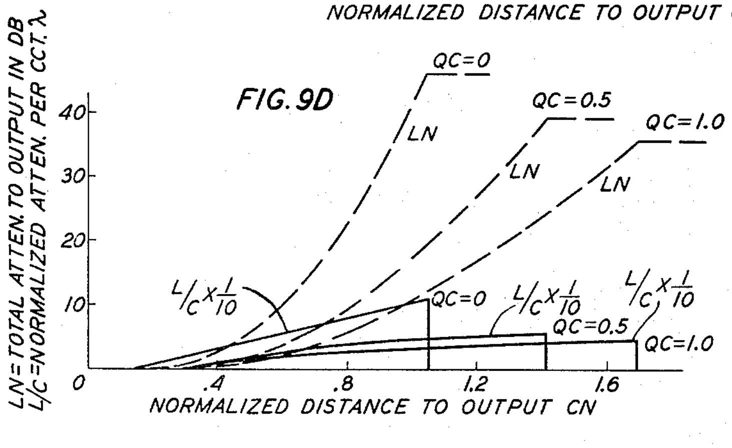

FIG. 8C represents a distribution of attenuation in accordance with a feature of the invention, the solid curve representing L/C plotted against CN and the dashed curves representing G and LN plotted against CN. QC is again taken as five-tenths. This distribution may be had, as has been previously described, by providing an essentially lossless circuit from the output back as far as stability considerations permit, and then providing attenuation per unit length equal to or greater than the net gain per unit length within the attenuating region. The attenuating region should be extended toward the input end of the tube to a point corresponding to a level of at least thirty-three decibels below the output, under low level conditions of operation. From this point, extending toward the input, the loss may be heavily concentrated in a short section until attenuation greater than the net gain of the tube has been accumulated. From the end of the heavy loss to the input is a lossless circuit of length corresponding to a CN equal to or greater than two-tenths.

The distribution illustrated in FIG. 8C allows twenty decibels of gain in the output section and provides an over-all attenuation in the opposite direction of the electron flow ten decibels greater than the total gain. This type of characteristic is generally the most favorable, because it provides, in most cases, the shortest tube consistent with obtaining the maximum power output and maintaining stability requirements. Furthermore, since most of the attenuation is concentrated, it detracts from the over-all gain less than if more of the loss were distributed.

FIG. 8D represents another attenuation distribution in accordance with a feature of the present invention. As in the other figures just discussed, the solid curve of FIG. 8D shows L/C plotted against CN and the dashed curves show G and LN plotted against CN. QC is once more taken as equal to five-tenths. The distribution shown uses the maximum attenuation consistent with power output in order to hold long-line effects and instability problems to a minimum. To determine such a distribution, it is assumed that if the level at any point in a non-uniform attenuating region is below six decibels less than the overload level in a uniform region of the same attenuation per unit length, the output level will not be seriously affected. Using curve "A" of FIG. 7 and obtaining the attenuation as a function of CN by graphically integrating BCΔN, the solid curve of FIG. 8D is obtained as the distribution providing the maximum protection against instability and long-line impedance effects. The attenuation extends to a distance from the input of CN equal to at least two-tenths.

It will be noted that the FIG. 8 attenuation distribution curves are, in a sense, inverse to those of FIG. 5. In FIG. 8, the abscissa represents distance measured from the output end of the circuit, while in FIG. 5 it represents distance measured from the input end.

All of the curves of FIG. 8 are derived for tubes with a space charge parameter QC of the order of five-tenths. The curves of FIG. 9 correspond to those of FIG. 8 except that QC is taken for three different values and the resulting field strength distributions are not indicated. The values of QC for which the curves are derived are zero, five-tenths, and unity, respectively.

The curves in FIGS. 8 and 9 are for a minimum length of tube consistent with the limitations imposed. The tube may be made of any length, and thus of any gain, by making the additional circuit length with cold attenuation per unit length equal to or greater than the net gain per unit length and placing the additional length adjacent to the region of heaviest attenuation.

In general, a distribution of attenuation along the circuit of a traveling-wave tube in accordance with the feature of the invention under discussion enables the tube to yield high power output and to operate at a high degree of efficiency. Instability and long-line impedance effects are minimized. To recapitulate, this feature of the invention comprises a distribution in which substantially lossless sections of the circuit are left at both ends of the tube and in which the attenuation is distributed along a center section intermediate the end sections so that the attenuation per unit length is at least several times greater near the input or upstream end than it is near the output or downstream end. In one embodiment of the invention the center section of distributed loss comprises a relatively short section of very high attenuation per unit length followed by a relatively long section of only moderate attenuation per unit length. In another embodiment, the attenuation per unit length in the center section is at a maximum near the input end of the section and decreases gradually to substantially zero at the output end. In both embodiments, the total attenuation over the length of the traveling-wave circuit is comparable in magnitude to the net gain of the tube.

In the described traveling-wave tube, the attenuation or loss material is deposited upon the helix supporting rods 35. In other varieties of traveling-wave tubes, other appropriate means of physical distribution may be employed.

In the operation of traveling-wave tubes, the dimensions of the electron stream should generally be maintained over relatively long distances. Otherwise, electrons tend to strike the traveling-wave circuit and become lost or tend to drift far enough away from the circuit so that coupling is lost. In either event, the gain of the tube may be seriously affected. Usually, beam dimensions have been maintained over relatively long distances by placing the whole beam and the associated structure in the strong uniform longitudinal magnetic field produced by a solenoid. Such a solenoid is usually large and bulky enough to surround the whole tube throughout its length and considerable focusing power is required, thereby reducing the over-all power efficiency of the system.

In accordance with another feature of the present invention, permanent magnets are employed as auxiliaries to a solenoid in a composite system. A relatively small solenoid may be used and the bulk and the power requirements of the focusing system are considerably reduced from those of the focusing systems used in the past.

As shown in FIG. 3, a relatively small diameter solenoid 48 fits around envelope 21 between wave guides 45 and 46. In order to extend the focusing field past the input and output circuits, a pair of relatively short permanent bar magnets 58 bridge input wave guide 45, while a similar pair of bar magnets 68 bridge output wave guide 46.

The axial magnetic field is kept uniform at the junction of the solenoid 48 and the permanent magnets 58 or 68 by overlapping the mechanical components so that the end turns of the coil 48 are nearly flush with the inner surfaces of the end plates 52 and 53. Thus the left-hand end of solenoid 48 is flush with the left-hand face of end plate 52, while the right-hand end of solenoid 48 is flush with the right-hand face of end plate 53. The solenoid field should, it is to be noted, be substantially equal to the permanent magnet field in strength.

In order to obtain field uniformity within the solenoid 48, the coil is effectively shielded from external leakage fields of the permanent magnets by shields 50 and 54.

Figure 10:
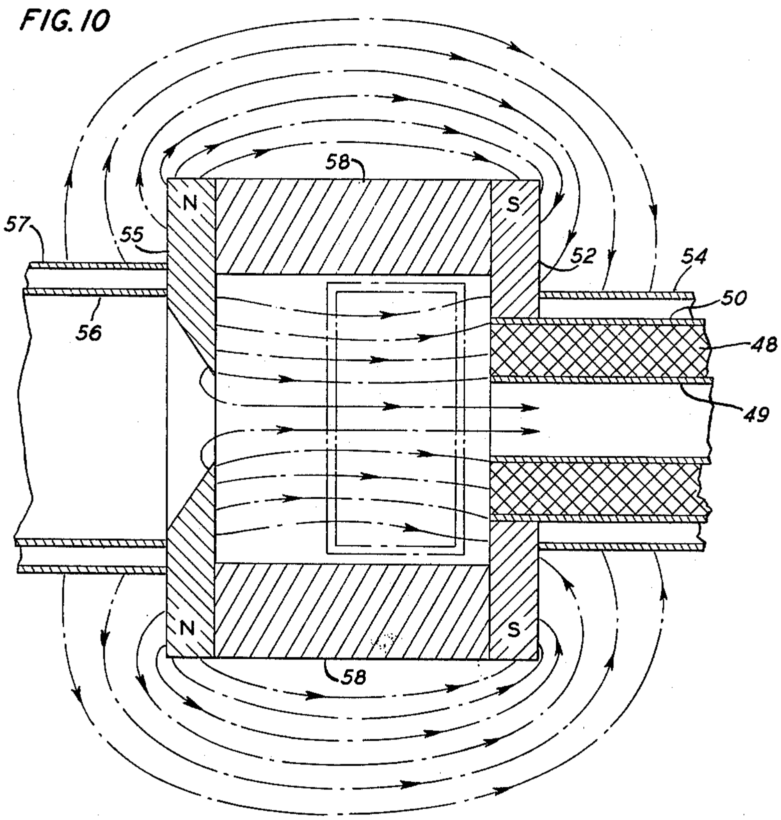
FIG. 10 shows the magnetic field distribution at the input end of the described tube.

FIG. 10 shows the distribution of the magnetic field at the input end of the described tube. For clarity, the tube itself is not shown and the section is taken at right angles to the section shown in FIG. 3. The position occupied by input wave guide 45 when the tube is inserted is shown by the dashed lines.

Through the employment of the feature of the present invention under discussion, it is found that not only is the focusing system more compact than those previously in use but also only about one-twentieth of the focusing power is required. Tubes making use of this feature of the invention are suitable for use in installations where space is at a premium. The physical size of the focusing system is small and the solenoid power supply need not be as large as is required if only a single large-diameter solenoid is employed.

As has been noted previously, a number of soft steel transverse plates or discs 60, 61, 62, and 64 are employed to straighten out possible defects in the magnetic focusing field. The plates are carefully aligned so that their planes are perpendicular to the direction of the desired magnetic field, and transverse components are thereby effectively removed.

Figure 11A:
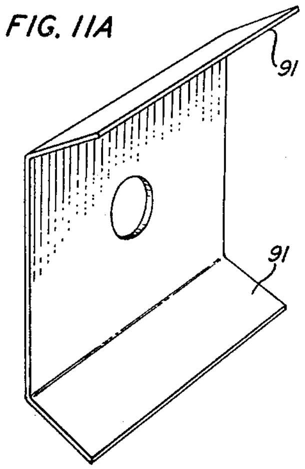
FIG. 11 shows two different devices for eliminating irregularities in the focusing field.
Figure 11B:
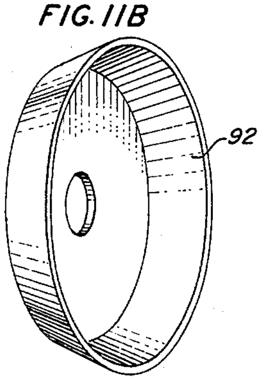

The transverse plates may have any convenient shape dictated by a particular application. In order to make the field strength more uniform along the axis of a long permanent magnetic structure, the transverse plates may be cupped or bent, as shown in FIGS. 11A and 11B. Such field straighteners form the basis of my copending application Serial No. 664,015, filed June 6, 1957, now United States Patent 2,942,141, issued June 21, 1960.

As an alternative to the composite focusing system which has been described, an all permanent magnet system may be used, employing numerous transverse steel plates or discs along the traveling-wave circuit to eliminate irregularities. Field uniformity may be obtained by magnetic shunting of high field regions, by controlling the magnetization along the magnet length, or by using magnets somewhat longer than the electron stream which is to be focused.

By way of example, four long permanent bar magnets may be used. Such magnets extend parallel to the tube axis and are equally spaced around its periphery. A large number of transverse steel plates are used to eliminate transverse irregularities in the magnetic field in the manner described above. As previously stated, in order to make the field strength more uniform along the axis of the structure, the transverse plates may be cupped or bent, as shown in FIGS. 11A and 11B. Shunting of the longitudinal field is obtained by means of the flaps, designated numerals 91 and 92, respectively, of FIGS. 11A and 11B, and can be varied by spacing the plates so that they are nearer together at the ends of the tube than at the middle. This method of shunting has the unique property that, while decreasing the field near the ends of the structure, it increases the field at the middle.

Another difficulty which has been encountered in the operation of traveling-wave tubes is the reduction of gain due to a velocity spread within the electron stream. The space charge of the electrons tends to cause a lowering of potential along the axis of the beam. The reduction in potential, in turn, tends to slow up the electrons in the center of the beam and cause them to travel more slowly than those on the outside. Since maximum gain in a traveling-wave tube is at least partially dependent on a relatively critical velocity separation between the electron stream and the traveling signal wave, the reduction of electron velocity along the beam axis tends to reduce the contribution of the central electrons to tube gain. The over-all gain of the tube, therefore, tends to be reduced. Electrons are, in effect, wasted, and the power efficiency of the tube is reduced.

In accordance with still another feature of the present invention, a converging electron gun is used and it is shielded from the magnetic focusing field, the electron stream being subjected to the field abruptly at the point of minimum beam diameter. A type of electron flow is thereby obtained in which the direct axial velocity is constant across the beam, but in which the electrons have a tangential velocity component proportional to their radial distance from the beam axis. In addition, beam focusing problems are minimized and a high degree of electron transmission without loss to the traveling-wave circuit is secured.

FIGS. 3 and 10 both show how the shielding and sudden application of the field is accomplished. The portion of envelope 21 which houses the electron gun is surrounded by magnetic shields 56 and 57. The electron gun is, therefore, in a substantially field free region as far as the magnetic focusing field is concerned. End plate 55 serves to shield the electron gun further and is located with its right-hand face aligned with the point of minimum beam diameter. The electron stream is thereby subjected to the magnetic focusing field abruptly. The direct axial velocity of the electron stream is constant across the stream, and the gain of the tube is not reduced by velocity variations within the stream.

In the operation of traveling-wave tubes of the type described, stability problems are often greater at about half the normal operating frequency than at the operating frequency. The electronic band width of the traveling-wave amplifier is much wider than the band widths of the signal input and output circuits and the associated apparatus. At microwave frequencies, it is convenient to operate the tube at frequencies higher than that of maximum electronic gain in order to have larger circuit dimensions and thus easier beam focusing conditions. For instance, the tube described has much greater gain at 2,000 megacycles than it has at 4,000 megacycles, where it is used. Stability problems tend, therefore, to be greater at the lower frequency.

In order to assure stable operation, it is desirable to provide much greater circuit attenuation than is required at the operating frequency (that is, 4,000 megacycles in the tube described). Since such extra attenuation tends to reduce the effectiveness of the tube at operating frequencies, it is desirable to apply it to the traveling-wave circuit in such a way that it provides much greater attenuation at frequencies lower than the operating frequency than it does at the operating frequency. This may be accomplished by placing the dissipative or lossy material in the vicinity of, but slightly removed from, the passive circuit of the tube. In the described tube, the lossy material may be coated on all sides of the helix supporting rods 35 but those contacting the helix 34. In effect, the lossy material is thus made greater on the portions of the rods 35 away from helix 34 than on those portions toward helix 34. Since the strength of the field set up by a traveling wave decreases more rapidly with distance from the helix 34 at higher frequencies than at lower frequencies, the lossy material on the outside of the rods 35 gives less attenuation at the operating frequency than at the lower maximum gain frequency, where the tube tends to be unstable.

Where the "plate" efficiency of a traveling-wave tube is an important factor, it may be made to be much higher than the beam efficiency by collecting the electrons at much lower than the beam voltage. By "plate" efficiency is meant the ratio of the output power to the total dissipation less heater power. Thus, referring to FIG. 3, collector 42 is connected to a point on main power supply 47 which is negative with respect to the point to which helix 34 is connected. It has been found that the electron beam may be collected at about one-third of the beam voltage without degrading the performance of the tube. The "plate" efficiency is thereby increased by a factor of two or three, depending on the focusing conditions.

When the electron beam is collected at reduced voltage, another factor tending to contribute to tube instability is that of secondary emission from the collector 42. Secondary electrons from collector 42 tend to return through the circuit, giving gain in the reverse direction, thus causing regeneration and, in some instances, oscillation. In order to avoid returning secondary electrons, a slight asymmetry in the magnetic focusing field is introduced near the collector 42. A small piece of magnetic material such as iron placed at one side of the collector electrode 42 introduces a field disturbance sufficient to deflect the secondary electrons and prevent them from returning through the circuit.

In a high current and voltage electron gun of the type shown in FIG. 3, a discharge phenomenon of momentary duration similar to the flash-arc common in high power tubes at lower frequency has often been observed. In the present instance, the discharge is to a low current electrode, the anode 31, and may be prevented by placing a resistance 69 in series with the anode 31 and the power supply 47. Resistance 69 should be equal to or larger than the negative impedance of the discharge. A ten thousand ohm resistor has been found quite effective and does not interfere with the normal operation of the tube.

In the operation of traveling-wave amplifiers, it is often found that output power is lost because of the slowing-up of the electron beam taking place at the output end of the tube. As the electron beam becomes modulated by interaction with the traveling-wave, it imparts energy to the wave, causing the wave to grow in amplitude. The transferred energy comes from the kinetic energy of the beam and the beam velocity tends to be decreased. As the beam velocity is decreased, the beam drops out of synchronism with the wave and power is lost. This power loss may be avoided by operating the tube at a beam voltage higher than the synchronous voltage. The beam is launched above the synchronous velocity and is slowed down to near synchronism at the output end of the tube. At a slight sacrifice in gain maximum power output is secured.

It is to be understood that the above-described arrangements are illustrative of the application of the principles of the invention. Numerous other arrangements may be devised by those skilled in the art without departing from the spirit and scope of the invention.

What is claimed is:

1. An amplifying space discharge device which comprises means defining a path of travel for electrons, an electron source, means adjacent said path for directing a stream of electrons from said source lengthwise along said path in a predetermined direction, and continuous electromagnetic wave transmission means disposed along said path, said transmission means comprising successively, in the direction of electron flow, a region of substantially no attenuation per unit length, a region of distributed attenuation in which the attenuation per unit length is at least several times greater at the end of the region nearest said source than at the other end of the region, and another region of substantially no attenuation per unit length, the length of said region of distributed attenuation being at least as great as the combined lengths of said regions of substantially no attenuation, the attenuation in said region of distributed attenuation being concentrated preponderantly in the half of said region nearest said source, and the attenuation per unit length in said region of distributed attenuation being less than its maximum value over a major portion of the length of said region.

2. An amplifying space discharge device which comprises means defining a path of travel for electrons, an electron source, means adjacent said path for directing a stream of electrons from said source lengthwise along said path in a predetermined direction, and continuous electromagnetic wave transmission means disposed along said path, said transmission means comprising successively, in the direction of electron flow, a region of substantially no attenuation per unit length, a region of high attenuation per unit length, a region of attenuation per unit length at least several times less than the attenuation per unit length of said region of high attenuation per unit length, and another region of substantially no attenuation per unit length, the length of said region of low attenuation being at least several times as great as the length of said region of high attenuation and the combined lengths of said regions of high and low attenuation being at least as great as the combined lengths of said regions of substantially no attenuation.

3. An amplifying space discharge device in accordance with claim 2 in which at least half of the attenuation of said wave transmission means is concentrated in said region of high attenuation per unit length.

4. An amplifying space discharge device which comprises means defining a path of travel for electrons, an electron source, means adjacent said path for directing a stream of electrons from said source lengthwise along said path in a predetermined direction, and continuous electromagnetic wave transmission means disposed along said path, said transmission means comprising successively in the direction of electron flow, a region of substantially no attenuation per unit length, a region of distributed attenuation in which the attenuation per unit length is maximum at the end of the region nearest said source and decreases gradually throughout the length of the region to substantially zero at the other end thereof, and another region of substantially no attenuation per unit length, the length of said region of distributed attenuation being at least as great as the combined lengths of said regions of substantially no attenuation.

5. An amplifying space discharge device in accordance with claim 4 in which the attenuation in said region of distributed attenuation is concentrated preponderantly in the upstream half of the region.

6. An amplifying space discharge device which comprisse an elongated non-conducting tubular envelope, an elongated helical conductor extending lengthwise of and within said envelope, an electron source, means to direct an electron stream from said source lengthwise through said helical conductor in a predetermined direction, a plurality of non-conducting rods extending lengthwise of said envelope and spacing said helical conductor apart from the interior of said envelope, and dissipative material concentrated preponderantly on the surfaces of said rods away from said helix, said dissipative material being deposited to give said rods successively, in the direction of electron flow, a region of substantially no attenuation per unit length, a region of distributed attenuation in which the attenuation per unit length is greater at the end of the region nearest said source than at the other end of the region and another region of substantially no attenuation per unit length, the length of said region of distributed attenuation being at least as great as the combined lengths of said regions of substantially no attenuation, the attenuation in said region of distributed attenuation being concentrated preponderantly in the half of said region nearest said source, and the attenuation per unit length in said region of distributed attenuation being less than its maximum value over a major portion of the length of said region.

7. An amplifying space discharge device which comprises an elongated non-conducting tubular envelope, an elongated wire helix extending lengthwise of and within said envelope, an electron source, electrode means to direct an electron stream from said source lengthwise through said helix in a predetermined direction, a plurality of non-conducting rods extending lengthwise of said envelope and spaced about the periphery of said helix to space said helix apart from the interior of said envelope, signal input coupling means in the form of a hollow wave guide positioned at the end of said helix nearest said source, signal output coupling means in the form of a hollow wave guide positioned at the other end of said helix, dissipative material disposed along said rods to divide said helix into successively, the direction of electron flow, a region of substantially no attenuation per unit length, a region of distributed attenuation in which the attenuation per unit length is at least several times greater at the end of the region nearest said source than at the other end of the region, and another region of substantially no attenuation per unit length, the length of said region of distributed attenuation being at least as great as the combined lengths of said regions of substantially no attenuation, the attenuation in said region of distributed attenuation being concentrated preponderantly in the half of said region nearest said source, and the attenuation per unit length in said region of distributed attenuation being less than its maximum value over a major portion of the length of said region, a solenoid surrounding said envelope and coaxially aligned therewith extending between said input and output wave guides to focus the electron stream, a pair of permanent magnets extending substantially parallel to the direction of electron flow bridged across said input wave guide on substantially opposite sides of said envelope to extend the magnetic focusing field of said solenoid substantially uniformity past said input wave guide in the direction toward said source, and a pair of permanent magnets extending substantially parallel to the direction of electron flow bridged across said output wave guide on substantially opposite sides of said envelope to extend the magnetic focusing field of said solenoid substantially uniformly past said output wave guide in the direction away from said source.

8. An amplifying space discharge device which comprises an elongated electrical wave transmission circuit, a converging electron gun positioned at one end of said transmission circuit to direct an initially converging stream of electrons lengthwise of and in coupled relationship with said transmission circuit, signal input coupling means at the end of said transmission circuit nearest said electron gun, signal output coupling means at the other end of said transmission circuit, means adjacent said transmission circuit to supply a longitudinal magnetic field extending substantially throughout the length of said transmission circuit to focus the electron stream, a plate of magnetic material between said electron gun and said input coupling means extending transversely of the electron stream, said electron gun being axially aligned with an aperture in said plate and said plate being transversely aligned with the point of minimum cross-section of the electron stream, and a magnetic shield surrounding said electron gun.

9. A traveling-wave amplifier including a helical wave conductor, a cathode adjacent one end of said wave conductor, a collector electrode adjacent the other end of said wave conductor, a signal input wave guide at one end of said conductor, a signal output wave guide at the other end of said conductor, electrostatic focusing means for directing electrons emitted by said cathode toward said wave conductor, an accelerator electrode between said cathode and said wave conductor having an orifice for the passage of electrons into said wave conductor, magnetic focusing means for directing said electrons through said wave conductor comprising a pole piece surrounding the space between said accelerator electrode and said helix, and extending over and magnetically shielding said cathode, a second pole piece in the vicinity of said collector electrode, and a magnetic structure extending between said pole pieces, said magnetic structure including a pair of permanent magnets extending substantially parallel to the direction of electron flow and bridged across at least one of said wave guides to extend the magnetic focusing field substantially uniformly past that wave guide.

10. Microwave energy vacuum tube apparatus comprising a wave guide structure for propagating microwave electromagnetic energy along an axis from one end toward the other end thereof, at a speed much slower than the velocity of light, signal input wave guide means at one end of said wave guide structure, signal output wave guide means at the other end of said wave guide structure, means for producing an electron stream directed along said axis in the direction from said one end toward the other end, said stream producing means including a focusing electrode for directing the electrons in said stream along parallel paths in a region adjacent said one end of said wave guide structure, means for producing a magnetic field aligned substantially parallel to said axis substantially throughout the length of said wave guide structure, said magnetic field producing means including an apertured pole piece surrounding said region and a magnetic shield comprising a tubular extension from said pole piece, surrounding said stream producing means, for directing the magnetic lines of force radially through said region to make the boundary of said stream cross substantially all of the magnetic lines of force which are enclosed by said boundary in said wave guide, said magnetic field producing means further including a pair of permanent magnets extending substantially parallel to the direction of electron flow bridged across at least one of said input and output wave guides to extend the magnetic focusing field uniformly past that wave guide.

11. An amplifying space discharge device which comprises electron-emissive and electron collector electrodes spaced apart to define a path of travel for electrons, an electro-magnetic wave transmission line disposed along said path between said electron-emissive and electron collector electrodes, said transmission line consisting substantially, in succession and in the direction from said electron-emissive electrode toward said electron collector electrode, of a section of substantially no attenuation per unit length, a section of distributed attenuation in which the attenuation per unit length is greater at the end toward said electron-emissive electrode than at the end toward said electron collector electrode, and another section of substantially no attenuation per unit length, the length of said section of distributed attenuation being at least as great as the combined lengths of said sections of substantially no attenuation, the attenuation in said section of distributed attenuation being concentrated preponderantly in the half of said section nearest said electron emissive electrode, and the attenuation per unit length in said section of distributed attenuation being less than its maximum value over a major portion of the length of said section, signal input coupling means at the end of said transmission line nearest said electron-emissive electrode, and signal output coupling means at the end of said transmission line nearest said electron collector electrode.

12. An amplifying space discharge device which comprises electron-emissive and electron collector electrodes spaced apart to define a path of travel for electrons, an electro-magnetic wave transmission line disposed along said path between said electron-emissive and electron collector electrodes, said transmission line consisting substantially, in succession and in the direction from said electron-emissive electrode toward said electron collector electrode, of a section of substantially no attenuation per unit length, a section of high attenuation per unit length, a section of attenuation per unit length at least several times less than the attenuation per unit length of said section of high attenuation per unit length, and another section of substantially no attenuation per unit length, the lengh of said section of low attenuation being at least several times as great as the length of said section of high attenuation, and the combined lengths of said sections of high and low attenuation being at least as great as the combined lengths of said sections of substantially no attenuation, signal input coupling means at the end of said transmission line nearest said electron-emissive electrode, and signal output coupling means at the end of said transmission line nearest said electron collector electrode.

13. An amplifying space discharge device in accordance with claim 12 in which at least half of the attenuation of said transmission line is concentrated in said region of high attenuation per unit length.

14. An amplifying space discharge device which comprises electron-emissive and electron collector electrodes spaced apart to define a path of travel for electrons, an electro-magnetic wave transmission line disposed along said path between said electron-emissive and electron collector electrodes, said transmission line consisting substantially, in succession and in the direction from said electron-emissive electrode toward said electron collector electrode, of a section of substantially no attenuation per unit length, a section of distributed attenuation in which the attenuation per unit length is maximum at the end toward said electron-emissive electrode and decreases gradually throughout the length of the section to substantially zero at the end toward said electron collector electrode, and another section of substantially no attenuation per unit length, the length of said section of distributed attenuation being at least as great as the combined lengths of said sections of substantially no attenuation, signal input coupling means at the end of said transmission line nearest said electron-emissive electrode, and signal output coupling means at the end of said transmission line nearest said electron collector electrode.

15. An amplifying space discharge device in accordance with claim 14 in which the attenuation in said region of distributed attenuation is concentrated preponderantly in the half of said region nearest said electron-emissive electrode.

16. A traveling wave amplifier including a helical wave conductor, a cathode adjacent one end of said wave conductor, a collector electrode adjacent the other end of said wave conductor, electrostatic focusing means for directing electrons emitted by said cathode toward said wave conductor, and an accelerator electrode between said cathode and said wave conductor having an orifice for the passage of electrons into said wave conductor, magnetic focusing means for directing said electrons through said wave conductor comprising a pole piece surrounding the space between said accelerator electrode and said helix, and extending over and magnetically shielding said cathode, a second pole piece in the vicinity of said collector electrode, and a magnet extending between said pole pieces.

17. Microwave energy vacuum tube apparatus comprising a wave guide structure for propagating microwave electromagnetic energy along an axis from one end toward the other end thereof, at a speed much slower than the velocity of light, means for producing an electron stream directed along said axis in the direction from said one end toward the other end, said stream producing means including a focusing electrode for directing the electrons in said stream along parallel paths in a region adjacent said one end of said wave guide structure, and means for producing a magnetic field aligned substantially parallel to said axis substantially throughout the length of said wave guide structure, said magnetic field producing means including an apertured pole piece surrounding said region and a magnetic shield comprising a tubular extension from said pole piece, surrounding said stream producing means, for directing the magnetic lines of force radially through said region to make the boundary of said stream cross substantially all of the magnetic lines of force which are enclosed by said boundary in said wave guide.

18. A traveling wave tube including a slow wave propagating structure of substantially tubular form and having a longitudinal axis, means including an apertured pole piece for producing a magnetic field which has a component radial to said axis in a region outside said structure and adjacent one end thereof and is substantially uniform and parallel to said axis throughout the space enclosed by said propagating structure, an electron gun for producing a beam of electrons whose paths are substantially parallel and rectilinear at a point which is a predetermined distance from said electron gun, said electron gun being spaced from said pole pieces to position said point substantially at the median of the region where said magnetic field has a radially directed component, whereby the electrons in said stream are deflected to enter said uniform field substantially without radial velocity but with a helical motion about said axis.

19. Microwave energy vacuum tube apparatus comprising a wave guide structure for propagating microwave electromagnetic energy along an axis from one end toward the other end thereof at a speed much slower than the velocity of light, means including a cathode for producing an electron stream directed along said axis in the direction from said one end toward the other end, said stream producing means including a focusing electrode for directing the electrons in said stream along parallel paths in a predetermined compact cylindrical region adjacent said one end of said wave guide structure, means for producing a magnetic field aligned substantially parallel to said axis substantially throughout the length of said wave guide structure, said magnetic field producing means including an apertured pole piece surrounding said region for directing the magnetic lines of force through said compact cylindrical region with radial components of direction therethrough, a magnetic shield surrounding said cathode and focusing electrode and for substantially shielding the magnetic lines of force from extension into any region of radial components of electron velocity, and vacuum envelope means enclosing said cathode and said axis and the electron stream space therealong throughout the length of said wave guide structure.

20. A traveling-wave tube including a slow wave propagating structure of substantially tubular form and having a longitudinal axis, means including a magnetic pole piece adjacent one end of said structure and having a portion with an aperture substantially coaxial with said structure for producing a magnetic field which has a component radial to said axis in said aperture and is substantially uniform and parallel to said axis throughout the space enclosed by said propagating structure, and means including a cathode and beam forming electrodes for producing a stream of electrons whose paths become substantially parallel and rectilinear at a point which is a predetermined distance from said cathode, said apertured portion of said pole piece being between said cathode and beam forming electrodes on one side and said one end of said slow wave propagating structure on the other side, said last-mentioned means being spaced from said pole piece to position said point in said aperture substantially at the median of the region where said magnetic field has a radially directed component.

References Cited in the file of this patent

UNITED STATES PATENTS

| | | |
|---|---|---|
| 2,122,538 | Potter | July 5, 1938 |
| 2,233,126 | Haeff | Feb. 25, 1941 |
| 2,300,052 | Lindenblad | Oct. 27, 1942 |
| 2,305,884 | Litton | Dec. 22, 1942 |
| 2,516,944 | Barnett | Aug. 1, 1950 |
| 2,541,843 | Tiley | Feb. 13, 1951 |
| 2,575,383 | Field | Nov. 20, 1951 |
| 2,584,597 | Landauer | Feb. 5, 1952 |
| 2,602,148 | Pierce | July 1, 1952 |
| 2,626,371 | Barnett et al. | Jan. 20, 1953 |
| 2,687,490 | Rich et al. | Aug. 24, 1954 |
| 2,730,649 | Dewey | Jan. 10, 1956 |

FOREIGN PATENTS

| | | |
|---|---|---|
| 934,220 | France | Jan. 7, 1948 |

OTHER REFERENCES

Article by Kompfner, pages 124 to 127, Proc. of the I.R.E. for February 1947, vol. 35, No. 2.

Article by Hollenberg, pages 52 to 58, Bell System Technical Journal for January 1949.